Figure 1:
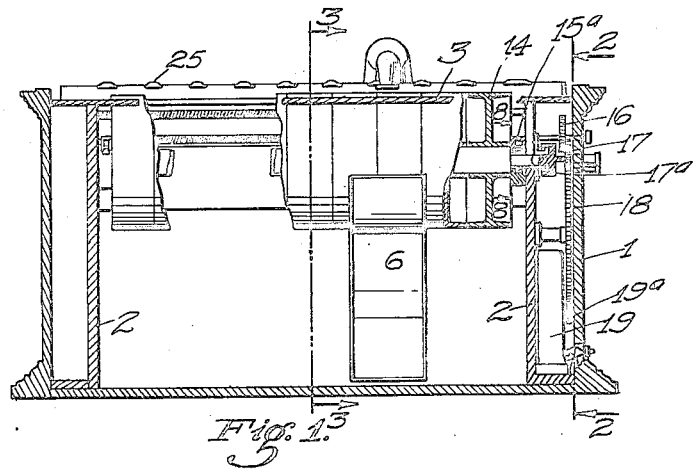

Feb. 27, 1923.

P. H. BEHRENS

PHONOGRAPH

Filed Sept. 30, 1920     4 sheets-sheet 1

1,446,539

INVENTOR.
PHILIP H. BEHRENS.
BY A. B. Bowman.
ATTORNEY.

Feb. 27, 1923.
P. H. BEHRENS
PHONOGRAPH
Filed Sept. 30, 1920
1,446,539
4 sheets-sheet 2
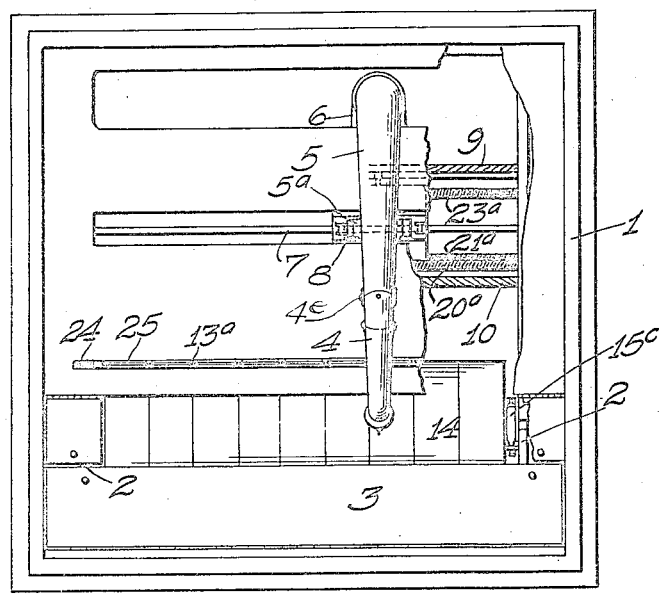
Fig. 4.
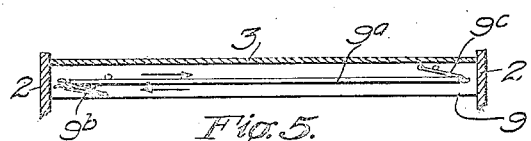
Fig. 5.
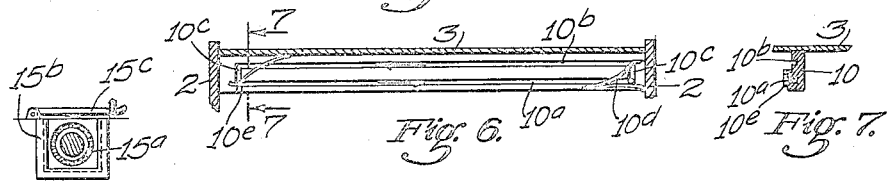
Fig. 6. Fig. 7.
Fig. 8.
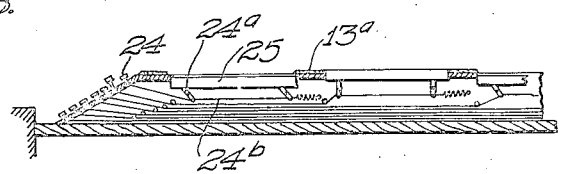
Fig. 9.
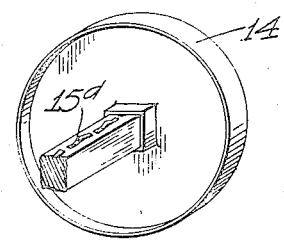
Fig. 10.
INVENTOR.
PHILIP H. BEHRENS.
BY A. B. Bowman
ATTORNEY.

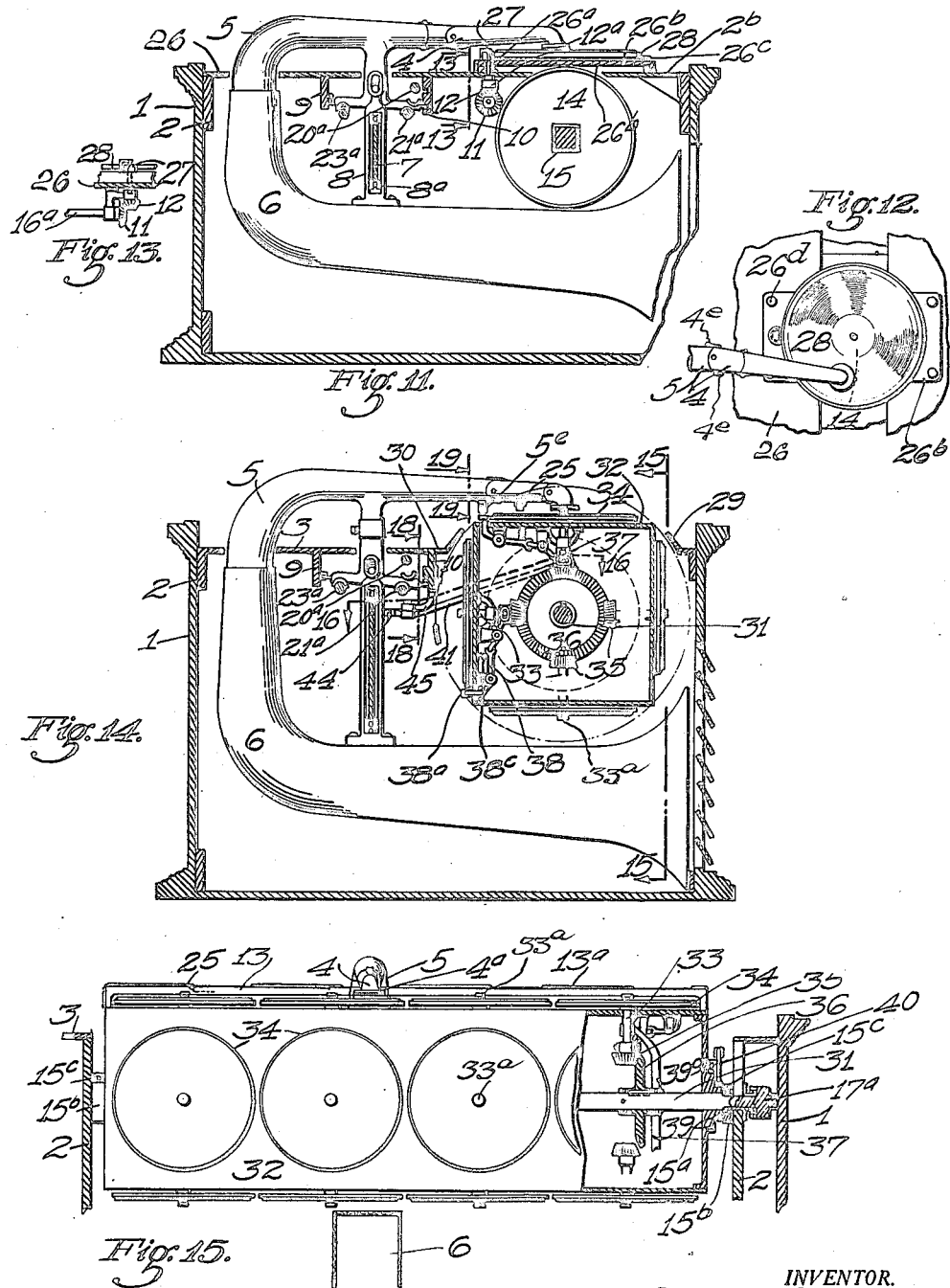

Feb. 27, 1923.

P. H. BEHRENS

PHONOGRAPH

Filed Sept. 30, 1920

1,446,539

4 sheets-sheet 4

INVENTOR.
PHILIP H. BEHRENS.
BY A. B. Bowman
ATTORNEY

Patented Feb. 27, 1923.

1,446,539

UNITED STATES PATENT OFFICE.

PHILIP H. BEHRENS, OF SAN DIEGO, CALIFORNIA, ASSIGNOR OF ONE-HALF TO FRANK E. JONES, OF SAN DIEGO, CALIFORNIA.

PHONOGRAPH.

Application filed September 30, 1920. Serial No. 413,726.

*To all whom it may concern:*

Be it known that I, PHILIP H. BEHRENS, a citizen of the United States, residing at San Diego, in the county of San Diego and State of California, have invented a certain new and useful Phonograph, of which the following is a specification.

My invention relates to sound reproducing machines usually known as phonographs and the objects of my invention are: First, to provide a phonograph wherein a plurality of records may be automatically played, one after the other in consecutive order or some of them skipped by a predetermined manual setting of the mechanism; second, to provide a phonograph of this class of new and novel construction; third, to provide a phonograph with new and novel form of record; fourth, to provide a phonograph of this class which will play a plurality of records in consecutive order automatically, of new and novel type record or an ordinary disk record with but slight changes in arrangement of parts; fifth, to provide a phonograph of this class in which any of the records may be skipped although positioned in consecutive order for playing by the manual operation of a portion of the mechanism; sixth, to provide a phonograph of this class in which a few or a large number of records may be played one after the other automatically in consecutive order or alternately or skipped if it is desired as predetermined; seventh, to provide a phonograph of this class with a new and novelly constructed tone arm and horn; eighth, to provide a phonograph of this class with novel operating mechanism; ninth, to provide a phonograph of this class in which the tone arm and horn move automatically together from one record to the other and automatically return from one side of the machine to the other; tenth, to provide a phonograph of this class with novel control mechanism and eleventh, to provide a phonograph of this class which is very simple and economical of construction, durable, easy to operate, automatic in its action throughout and which will not readily deteriorate or get out of order.

Figure 2:
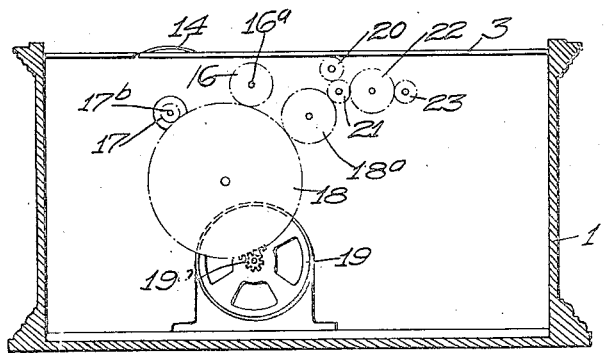
Figure 3:
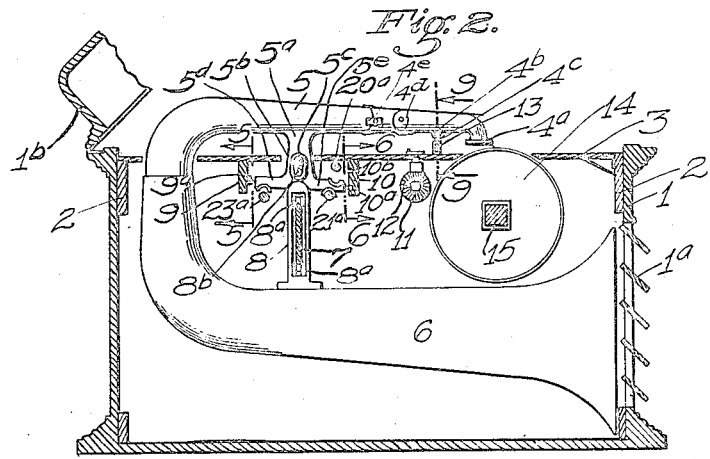
Figure 16:
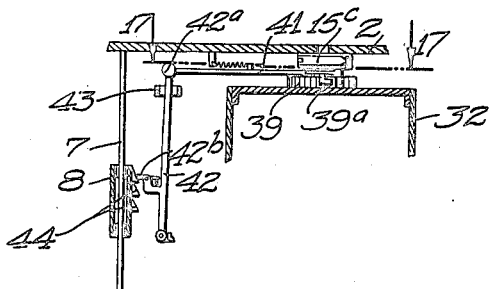
Figure 17:
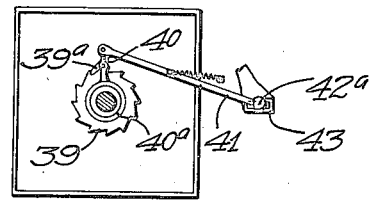
Figure 18:
Figure 19:
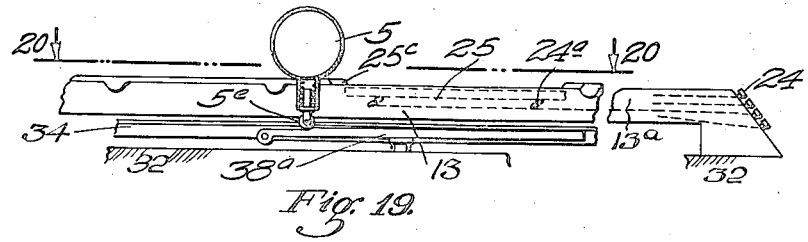
Figure 20:
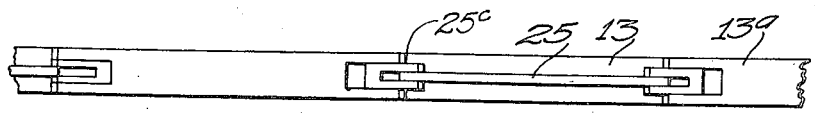

With these and other objects in view as will appear hereinafter my invention consists of certain novel features of construction combination and arrangement of parts and portions as will be hereinafter described in detail and particularly set forth in the appended claims, reference being had to the accompanying drawings and to the character of reference thereon which form a part of this application in which:

Figure 1 is a partial end elevational and transverse sectional view of my phonograph in one form; Fig. 2 is a sectional view through 2—2 of Fig. 1; Fig. 3 is a sectional view through 3—3 of Fig. 1; Fig. 4 is a top or plan view of my phonograph in the same form as Fig. 1 showing portions broken away and in section to facilitate the illustration; Fig. 5 is a fragmentary sectional view through 5—5 of Fig. 3; Fig. 6 is a similar view through 6—6 of Fig. 3; Fig. 7 is a sectional view through 7—7 of Fig. 6; Fig. 8 is a sectional view through 8—8 of Fig. 1 on an enlarged scale; Fig. 9 is a sectional view through 9—9 of Fig. 3 on an enlarged scale; Fig. 10 is a fragmentary perspective view showing the shaft with one of the drum records positioned thereon; Fig. 11 is a partial sectional and elevational view of my phonograph in a slightly modified form from that disclosed in Figures 1 to 10 inclusive of the drawings and showing a structure wherein an ordinary disk record may be played on the same machine by the substitution of a certain member in the machine shown in the drawings Figure 1 to 10 inclusive; Fig. 12 is a fragmentary detailed plan view of the tone arm structure as modified for use where the disk record is played in connection; Fig. 13 is a sectional view through 13—13 of Fig. 11; Fig. 14 is a partial sectional and elevational view of another modified form to that of the other views of the drawings in which a plurality of conventional disk records instead of special records may be played and played in consecutive order or alternately or skipped as desired and in which the shifting mechanism may be substituted so that either may be used; Fig. 15 is a fragmentary sectional view through 15—15 of Fig. 14; Fig. 16 is a fragmentary sectional view through 16—16 of Fig. 14; Fig. 17 is a top view from the line 17—17 of Fig. 16; Fig. 18 is a fragmentary sectional view through 18—18 of Fig. 14; Fig. 19 is a similar view through 19—19 of Fig. 14 and Fig. 20 is a top view from the lines 20—20 of Fig. 19.

Similar characters of reference refer to similar parts and portions throughout the several views of the drawings.

The casing 1, partitions 2, cover plate 3, tone arm members 4 and 5, horn 6, horn supporting track 7, control guide member 8, guides 9 and 10, bevel gear 11, bevel pinion 12, tone arm control support 13, drum record 14, axle 15, gears 16, 17 and 18, motor 19, gears 20, 21, 22, and 23, buttons 24, and shiftable members 25, constitute the principal parts and portions of my phonograph in its simplest form.

The casing 1 is a rectangular box provided at its front end with a plurality of shutters 1ª in the conventional form and it is provided in each side spaced from the side walls with partitions 2 shown best in Fig. 1 of the drawings and on the top with a plate 3 and with a lid 1ᵇ hinged on one side for covering the same. It is provided with a plurality of screw members 20ª, 21ª and 23ª which are revolubly mounted transversely across said box and positioned as shown best in Figs. 2 and 3 of the drawings. Also mounted transversely across said box and secured to the side walls is a track member 7 over which is mounted a guide member 8 which is provided with rollers 8ª which are adapted to engage the top and bottom edges of the track member 7 for holding said guide member 8 in certain position but permitting it to move transversely across the interior of said casing 1. Secured to the lower end of this guide member 8 is the horn 6, the open end of which is preferably oblong in shape as shown best in Fig. 1 of the drawings and is adapted to move in front of the shutters 1ª. To the other end is telescopically connected the tone arm member 5 which extends upwardly through the plate 3, then forwardly as shown best in Figs. 3, 11 and 14 of the drawings and pivotally connected to the forward extending end of the member 5 is another tone arm member 4 the downward pivotal movement being limited by a lug 4ᵈ which tone arm member 4 carries the diaphragm 4ª and needle which is of the conventional type. This tone arm portion 4 is provided with a lug 4ᶜ in which is mounted a roller 4ᵇ which is adapted to engage the support 13 and roll along the same with the transverse movement of the horn and tone arm. Extending downwardly from the member 5 is a portion 5ª which is provided with an elongated hole 5ᵇ therein in which is mounted a spring 5ᶜ. This hole is also adapted for a lug 8ᵇ on the upper end of the guide 8 which serves as a pivotal support for the tone arm 5 which is adapted to rock thereon, the one end telescoping in the small end of the horn 6 and its other end removes the needle from the record when said end is tilted upwardly, and the spring is positioned between said lug 8ᵇ and the upper end of the slot 5ᵇ in said slot. This member 5ª is provided with laterally extending arms 5ᵈ and 5ᵉ. The arm 5ᵈ is provided with a semi-annular lug member which is threaded adapted to conform with the threads on the screw 23ª and the arm 5ᵉ is provided with similar lugs on opposite sides, the upper one provided with threads adapted to engage and conform with the screw 20ª, the lower one adapted to engage and conform with the threads on the screw 21ª. Secured on the lower side of the cover plate 3 are the guide members 9 and 10. The guide member 9 is provided with a ledge 9ª which is adapted to engage a roller on the arm 5ᵈ and the member 10 is provided with notches 10ª and 10ᵇ adapted to engage a roller on the end of the arm 5ᵉ when said arm is in varying positions as will be hereinafter described. Secured to the inner surface of the partitions 2 in any conventional manner are ball bearings housings 15ᵇ in which are supported ball bearings 15ª, held in position by a latch 15ᶜ as shown best in Fig. 8 of the drawings. Mounted in these bearings are the reduced ends of the shaft 15, the reduced ends of which are round and the remainder of said shaft is square as shown best in Fig. 10 of the drawings adapted for square holes in the center of the drum records 14. It will be noted that these drum records 14 are in the form of an ordinary pulley as shown best in section lines in Fig. 1 of the drawings and in the outer surface are the sound producing grooves. The axle 15 is provided with a plurality of springs 15ᵈ in one side thereof which are adapted to engage the interior of the hubs of the records 14 when they are positioned thereon for holding them in position shown best in Fig. 10. On this shaft are mounted a plurality of these drum records placed side by side as shown best in Fig. 1 of the drawings. The one end of the axle 15 connects by tongue and groove with a flanged shaft 17ᵇ which is revolubly mounted in the slotted bearing 17ª secured to the partition 2 which permits the removal of the shaft 15. Mounted on said shaft 17ᵇ is a pinion 17 and this pinion 17 engages the gear 18 which meshes with a pinion 19ª on the main shaft of the motor 19 thus providing means for turning the shaft 15 and therefore the drum records. Also meshing with the gear 18 is another gear 16 and another gear 18ª and meshing with this gear 18ª is the gear 21 which revolves the screw 21ª and meshing with the gear 21 is another gear 20 which is secured to the screw member 20ª and revolves the same. Meshing with the other side of the gear 21 is an intermediate gear 22 and the other side of which meshes with another gear 23 which is secured to the screw member 23ª and adapted to turn the same. This screw 23ª and the screw 20ª are provided with greater pitch threads thus providing for greater speed with the backward or reverse movement and when passing between the records, the latter particularly adapted for the disk record machine as shown best in Figs. 14 and 15 and following, of the drawings.

The screws $20^a$, $21^a$ and $23^a$ are engaged by the arm members $5^d$ and $5^e$ as follows: The screw $21^a$ is the operating screw for feeding the needle along the record and in the operative position as shown in Fig. 3 of the drawing. The member 10 is provided with two longitudinal slots $10^a$ and $10^b$ and these are connected at their opposite ends by vertical slots $10^c$ shown best in Fig. 6 of the drawings and secured adjacent the ends are spring members $10^d$ and $10^e$. When the roller in the slot $10^a$ reaches the spring $10^d$ it depresses the spring $10^d$ so that when it reaches the vertical slot $10^c$ the spring forces the end of the arm $5^e$ upwardly so that it engages the screw $20^a$ which is a reverse screw and the roller moves backwardly in the slot $10^b$ until it reaches the spring $10^e$ which depresses said spring and moves backward until it reaches the vertical slot $10^c$ whereupon the spring $10^e$ moves it backwardly again until the arm member engages the member $21^a$ as shown best in Fig. 3 of the drawings and the action is repeated. The guide 9, as shown best in Figs. 3 and 5 of the drawings, is provided with a ledge $9^a$ and the roller on the end of the arm $5^d$ rolls along the lower side of this ledge $9^a$ when in operative position as shown in Fig. 3 of the drawings, and when it gets to the end it engages the spring $9^b$ which moves the roller upwardly and at the same time the opposite end engages the screw $20^a$ which reverses the movement and the roller is carried back along the upper side of the ledge $9^a$ until it engages the spring $9^c$ at the opposite end and is forced to the lower side in the operative position as shown in Fig. 3. It will be here noted that the screw $23^a$ is not used in the construction shown in Figs. 1, 2 and 3 of the drawings where the drum record 14 is used because there is only a little space between the two records. The tone arm control 13 consists of a track shown best in Fig. 9 of the drawings which is provided with raised portions $13^a$ which the roller $4^b$ engages which raises the tone arm 4 so that the needle does not engage the record until it passes over these raised portions $13^a$ and in order to skip a record or alternate them there is provided a plurality of blocks 25, one of which is shown up and the other down in Fig. 9 of the drawings and these are supported by buttons $24^a$ which are controlled by cables $24^b$ which connect with buttons 24 so that by movement of the buttons 24 certain of the records may be skipped as predetermined by the movement of the blocks 25 and raising the member 25 to a position so that the tone arm is held upwardly so that the needle does not engage the record.

In the modified form of construction shown in Figs. 11, 12 and 13 of the drawings the construction is the same as hereinbefore described and disclosed in Figs. 1 to 10 inclusive, except that the plate 3 and the track 13 is removed and a plate 26 substituted for the plate 3. On the shaft $16^a$ upon which the gear 16 is mounted is a bevel gear 11 which meshes with a bevel pinion 12 which is mounted on a shaft which is journaled vertically in a bearing $12^a$ secured to the plate 26. The upper end of said shaft is provided with a square hole which is adapted for a shaft $26^a$ which is square at its lower end and mounted on the upper end of this shaft is a friction member 27 which engages a disk member 28 upon which the disk is adapted to be mounted in the conventional form of disk support and this disk support 28 is pivotally mounted on a raised portion $26^b$ which is secured to the plate 26 by the screws $26^d$ preferably near the portion of the casing housing the driving mechanism and provided with a brake $26^c$ for stopping the same. It will be noted that the gear 16 is shifted inwardly by a knob which extends outwardly through the casing when the drum type of record is used as shown best in Fig. 1 of the drawing. When the disk type is used this gear 16 is shifted outwardly and meshes with the gear 18 while the gears 17 and $18^a$ are similarly shifted inwardly so that they are disengaged from the gear 18 and the tone arm is unlatched by turning the latches $4^e$ on the sides of the tone arm so that the portion 4 moves on a vertical axis giving its end a radius or shifting inwardly and outwardly on the disk record as shown best in Fig. 12 of the drawings.

In the modified form of construction shown in Figs. 14 and 15 the construction is the same as hereinbefore described, except that the plate 3 is substituted by plates 29 and 30 and the axle 15 is substituted by the following described mechanism: An axle 31 with ends which are adapted to fit in the bearings and conforming to the ends of the axle 15 is used and revolubly mounted thereon is a rectangular shaped casing 32 in the four sides of which are journaled shafts 33 upon which are secured the conventional disk pads or supports 34 upon which are mounted the disc records in the conventional manner and secured by means of nuts $33^a$. These shafts extend through the walls of the casing 32 and on their inner ends are shiftably mounted bevel pinions 35 which are adapted to engage, and disengage with bevel gears 36 secured on the shaft 31, the shafts 33 being further supported by spiders 37 and each of the gears 35 are provided with a link shifting apparatus 38 which is adapted to shift the gear 35 into and out of mesh with the gear 36 operative by a button $38^a$ shown best in Fig. 14 of the drawings.

Secured on the one end of the casing 32 is a ratchet wheel 39 and mounted in connection therewith is an arm 40 upon which is mounted a pawl 39$^a$ which is adapted to engage said ratchet wheel and this support 40 is secured on a band 40$^a$ around the hub of the ratchet wheel 39 shown best in Fig. 17 of the drawings. Secured to the arm 40 is a rod 41 which connects with a lever 42 by means of a ball joint 42$^a$ and is guided by a guide 43.

The other end of said lever 42 is pivotally mounted upon an arm 45 shown best in Fig. 14 which is secured to the guide member 10 and extends therefrom. It is provided with a lever 42$^b$ provided with a roller on its extended end and secured on the control member 8 are ratchet teeth 44, over which said roller moves shown best in Fig. 16 thus reciprocating the lever 42 on its pivotal mounting and in turn operating the ratchet pawl 39$^a$ on the ratchet wheel 39 which in turn revolves the casing 32 a one-quarter revolution, the ratchets 44 being positioned only near the end so that the one-quarter revolution takes place only after the tone arm has passed over the four records positioned on each side of the casing 32. Mounted on the lower side of the tone arm member 5, as shown in Figs. 14 and 15 of the drawings only there is provided an inclined member 5$^e$ which is adapted to be engaged by the extended portions 38$^a$ of the double lever mechanism 38 which shifts the bevel pinions 35 through said lever mechanism into mesh with the gear 36 which starts the revolution of the disk record, it being noted that the other bevel pinions are held out of mesh with the gear 36 by the spring 38$^c$, except when the member 38$^a$ engages the inclined member 5$^e$ on the tone arm member 5.

In order to speed over the space between the records, particularly in the mechanism disclosed in Figs. 14, 15 and following at a higher speed there is provided the rack member as shown in Fig. 18 of the drawings which is a slight modification of the guide member 10 from that hereinbefore described in which the slot 10$^a$ is provided with cross notches 10$^c$ which are provided with springs 10$^d$ positioned in opposite directions in the alternate notches so that the arm 5$^e$ is moved upwardly and downwardly thus moving the opposite end of the arm 5$^d$ so that it engages with the screw 23$^a$, which is the high pitch screw, causing a rapid movement of the horn and tone arm between the records.

In Figs. 19 and 20 there is shown a modification of the support 13 which is in the form of a bridge over the records, one on each of the sides of the member 32 and secured to said member at each end as shown in Figs. 15 and 19 and a modification of the support 25 in which the raised portions between the portions 13$^a$ are adjustible in length there being provided blocks, 25$^c$ which permit movement for positioning different blocks thus providing for adjustment for varying sized disk records.

Though I have shown and described a particular construction, combination and arrangement of parts and portions and certain modifications thereof I do not wish to be limited to this particular construction, combination and arrangement, nor to the modifications thereof but desire to include in the purview of my invention the construction, combination and arrangement substantially as set forth in the appended claims.

It is obvious that with this construction there is provided a sound reproducing machine in the form of a phonograph in which a plurality of records may be automatically played, one after another in consecutive order or some skipped as predetermined and the mechanism manually adjusted for such operation; that the tone arm and horn pass from one side of the casing to the other and play the records positioned side by side as they pass over and that there is provided means for skipping any of the records desired; that when the horn reaches the opposite side there is provided means for returning it; that in one of the modified forms of construction there is provided a means wherein with a slight change of the cover plate, disk records may be played in substitution for the special drum records; that in the modification shown in Fig. 14 and following by substitution of the record operating mechanism which is easily operated and substitution of the cover plate disk, records may be played in consecutive order or skipped as hereinbefore set forth; that the main operative parts of the one machine with some substitutions can be made to operate on the simple special drum records or on drum records and disk records or on disk records only in consecutive order.

Having thus described my invention what I claim as new and desire to secure by Letters Patent is:

1. A phonograph, including a casing, a plurality of records positioned in alined, consecutive order in said casing and operative therein, a tone arm and horn adapted to travel across said casing and play said records in consecutive order, means for operating said tone arm, horn and records and means for returning said tone arm and horn to the opposite side of said casing when it has reached the end of the records.

2. A phonograph, including a casing, a plurality of records positioned in alined, consecutive order in said casing and operative therein, a tone arm and horn adapted to travel across said casing and play said records in consecutive order, means for simultaneously operating said tone arm, horn and records, means for returning said tone arm and horn to the opposite side of said casing when it has reached the end of the records and supporting means for said tone arm and means for operating said supporting means whereby any of said records may be skipped as predetermined.

3. A phonograph, including a casing, a plurality of records positioned in alined, consecutive order in said casing and operative therein, a tone arm and horn adapted to travel across said casing and play said records in consecutive order, means for simultaneously operating said tone arm, horn and records, means for returning said tone arm and horn to the opposite side of said casing when it has reached the end of the records, supporting means for said tone arm, means for operating said supporting means whereby any of said records may be skipped as predetermined and means for facilitating the speed of the tone arm during a portion of its movement.

4. A phonograph, including a casing, a tone arm and horn reciprocably mounted therein, means for reciprocating the same, a plurality of records positioned in alined consecutive order adapted to be engaged by the needle on the tone arm and means for raising the tone arm at any predetermined position in its forward movement.

5. A phonograph, including a casing, a tone arm and horn reciprocably mounted therein, means for reciprocating the same, a plurality of records positioned in alined consecutive order adapted to be engaged by the needle on the tone arm, means for raising the tone arm at any predetermined position in its forward movement and means for actuating said records simultaneously with the forward movement of said horn and tone arm.

6. In a phonograph, a reproducing record, comprising an annular flange provided with reproducing grooves therein, a web extending inwardly therefrom, a hub member internally connected with said web and an axle member adapted to fit in said hub and turn said record.

7. In a phonograph, a reproducing record, comprising an annular flange provided with reproducing grooves therein, a web extending therefrom, a hub member internally connected with said web, an axle member adapted to fit in said hub and turn said record and means for readily connecting and disconnecting said axle with a driving mechanism.

8. A phonograph of the class described, including a casing provided with a longitudinal opening in one end, a horn with its open end reciprocably mounted in said casing in front of said opening, a tone arm telescopically mounted in connection with said horn means for raising and lowering the needle portion of said tone arm at intervals in its forward movement.

9. A phonograph of the class described, including a casing provided with a longitudinal opening in one end, a horn with its open end reciprocably mounted in said casing in front of said opening, a tone arm telescopically mounted in connection with said horn means for raising and lowering the needle portion of said tone arm at intervals in its forward movement and means for raising and holding it in raised position during its reverse movement.

10. A phonograph of the class described, including a casing provided with a longitudinal opening in one end, a horn with its open end reciprocably mounted in said casing in front of said opening a tone arm telescopically mounted in connection with said horn, means for raising and lowering the needle portion of said tone arm at intervals in its forward movement, means for raising and holding it in raised position during its reverse movement and a plurality of special records positioned in alinement with the extended end of the tone arm and adapted to be engaged by the needle.

In testimony whereof, I have hereunto set my hand at San Diego, California, this 18th day of September, 1920.

PHILIP H. BEHRENS.